Figure 1:
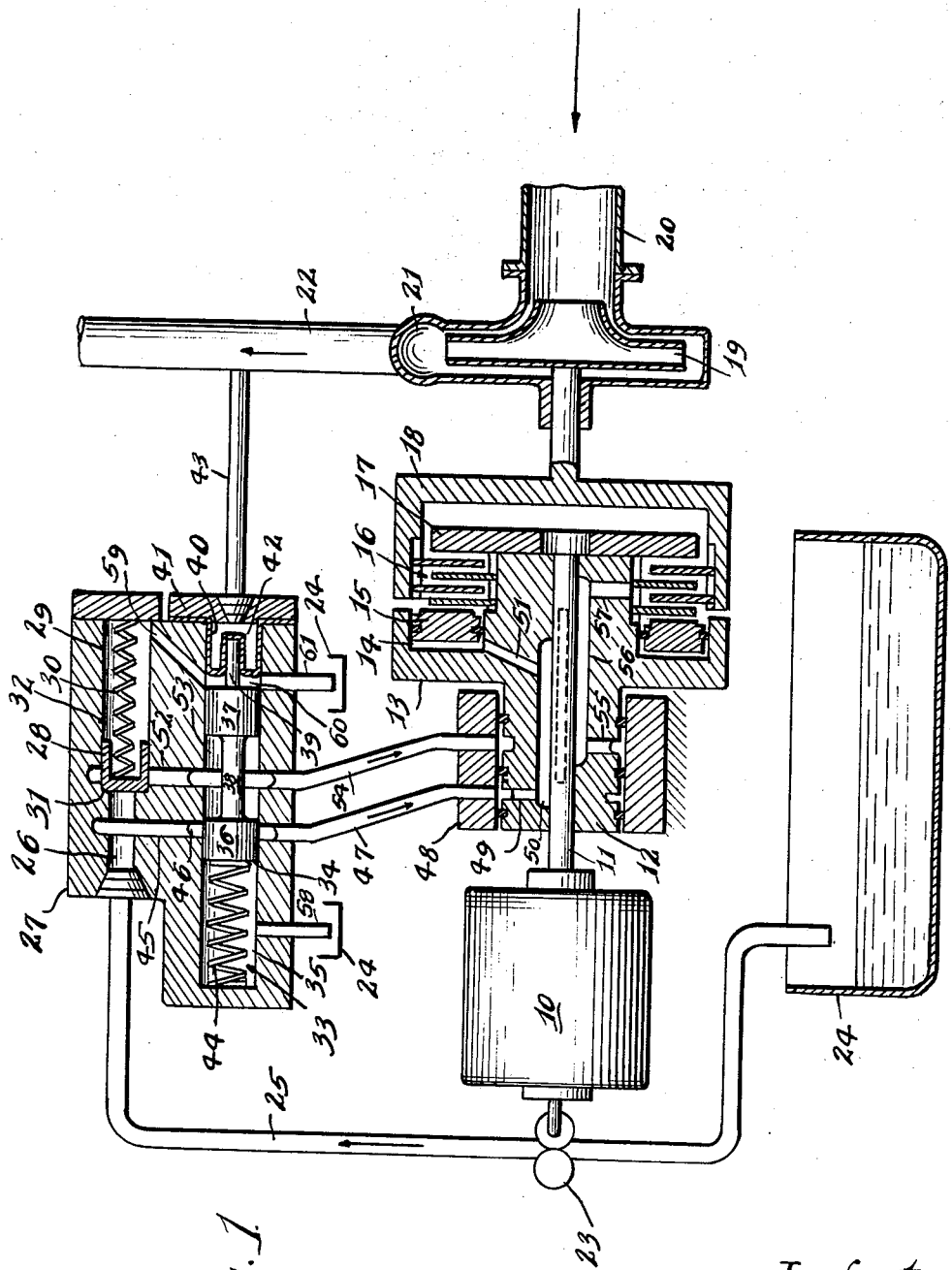

Nov. 3, 1964   W. F. SHURTS ETAL   3,155,040
BOOSTER PRESSURE CONTROL FOR LIQUID SYSTEMS
Filed May 15, 1962

Inventors.
Wilbur F. Shurts.
Joseph B. Snoy.
By John W Dailey
Attorney.

United States Patent Office 3,155,040
Patented Nov. 3, 1964

3,155,040
BOOSTER PRESSURE CONTROL FOR
LIQUID SYSTEMS
Wilbur F. Shurts, Winnebago, and Joseph B. Snoy, Rockford, Ill., assignors to Twin Disc Clutch Company, Racine, Wis., a corporation of Wisconsin
Filed May 15, 1962, Ser. No. 194,783
5 Claims. (Cl. 103—35)

Our invention relates to an automatically variable, booster pressure control for liquid systems.

A typical example of such a system is that for water distribution in a building which will be referred to for purpose of description, although the invention is not limited thereto. There are several problems inherent in such a system, namely, it is usually supplied by a city main in which the pressure is subject to fluctuation, the system itself may be subject to widely varying demands, and there may be situations involving both of these factors. In none of these cases, therefore, is a constant head maintained in the system.

It is accordingly one object of our invention to provide a pressure control for a liquid system which maintains a substantially constant head therein irrespective of pressure fluctuations in the liquid source or demand variations on the system.

A further object is to provide a control of the character indicated having auxiliary system means which includes a booster pump forming a part of the liquid system and which is driven by a constant speed power source through a friction plate clutch whose intensity of engagement and hence the speed of the pump varies with pressure fluctuations on the discharge side of the pump.

The drawing, partially in section, schematically shows the pressure control in a condition of zero pressure in the auxiliary system.

The numeral 10 designates a constant speed power source, such as an induction motor by way of example, which drivably connects through a shaft 11 with a hub 12. The remote end of the hub 12 carries an annular flange 13 which is recessed from one side to form an annular cylinder 14 in which is reciprocable a suitably sealed, annular piston 15. When the piston 15 is moved to the right as presently described, it engages a friction plate clutch 16 against an abutment plate 17 which is fast to the shaft 11, alternate and intervening plates of the clutch 16 being conventionally connected to the hub 12 and a spider 18, respectively. The spider 18 drivably connects with a centrifugal pump 19 having a liquid inlet 20 and an outlet 21 leading to a pipe 22 forming part of a distribution system (not shown).

The principle of this invention resides in the concept that since the torque required to drive a centrifugal pump is proportional to the square of the pump speed, this speed can be determined under varying conditions in the liquid system by varying the capacity of the clutch, i.e., by varying the intensity of contact of the plates of the clutch between end limits of zero and maximum engagement and including infinite conditionings of the clutch when its plates are in relative sliding contact with accompanying infinite variations in torque transmission. In the present instance, an automatic control, responsive to pressure variations in the pipe 22, is provided for conditioning the clutch 16.

The motor 10 also drives a conventional pump 23 which withdraws oil from a sump 24 and delivers the same through a pipe 25 to an inlet chamber 26 provided in a combination valve casing 27. Pressure in the chamber 26 is active against a piston 28 slidable in a coaxial, enlarged diameter chamber 29 and biased by a spring 30 into the closed position shown against an annular shoulder 31 formed by the junction of the chambers 26 and 29.

The piston 28 and spring 30 constitute a conventional, pressure regulating valve 32 for determining the maximum pressure of the oil pump 23.

Also mounted in the casing 27 is a modulating valve 33 comprising a valve stem 34 reciprocable in a chamber 35 and composed of pistons 36 and 37 spaced and connected by a reduced neck 38. Extending from the opposite end of the piston 37 is a support 39 partially enclosed and abutted by a diaphragm 40 whose periphery is sealably clamped between the casing 27 and a cover plate 41. The diaphragm 40 defines with the cover plate 41 a chamber 42 which constantly connects by a pipe 43 with the pipe 22 so that the pressure in the latter pipe and the chamber 42 is always the same. In the non-operative position, the valve stem 34 is held in the position shown by a spring 44 interposed between the left closed end of the chamber 35 and the piston 36.

In the position of parts shown, the inlet chamber 26 connects successively through a passage 45, an annular passage 46 encircling the piston 36, both of said passages lying within the casing 27, a pipe 47 whose delivery end is included in a stationary ring 48 surrounding the hub 12, a radial passage 49, a longitudinal passage 50 and an outwardly extending passage 51 with the cylinder 14, the passages 49, 50 and 51 being included in the hub 12. The portion of the system terminating in the passage 51 supplies engaging pressure to the clutch cylinder 14 under determined conditions.

When the piston 28 is displaced to the right by pump pressure as presently described, the chamber 29 connects successively and constantly through a passage 52 in the casing 27, the portion 53 of the chamber 35 between the pistons 36 and 37, a pipe 54 whose delivery end is included in the stationary ring 48, a radial passage 55, a longitudinal passage 56 and a radial passage 57 with the inner edges of the plates of the clutch 16, the passages 55, 56 and 57 being included in the hub 12. Under operating conditions, the portion of the system terminating in the passage 57 constantly supplies cooling oil to the clutch plates.

It will be understood that suitable seals are interposed between the hub 12 and stationary ring 48 to maintain the integrity of the pressure and cooling lines to the clutch 16.

Under running conditions, the motor 10 operates at constant speed and hence also the oil pump 23 whose delivered pressure shifts the piston 28 to uncover the inlet to the passage 52, thus maintaining a constant flow of cooling oil over the plates of the clutch 16 whether fully engaged, fully disengaged or in any intermediate slip condition.

When the pressure in the pipe 22 is lower than the desired value, the spring 44 maintains the valve stem 34 in the position shown so that full oil pump pressure up to the maximum established by the pressure regulating valve 32 is applied to the piston 15 to fully engage the clutch 16 and rotate the pump 19 at maximum speed to raise the pressure in the pipe 22. In this situation, the annular passage 46 passes the pressure oil around the piston 36.

As the pressure in the pipe 22 approaches the desired pressure, the accompanying pressure rise in the diaphragm chamber 42 expands the diaphragm towards the left to thereby shift the valve stem 34 in the same direction. Accordingly, the piston 36 uncovers to some extent the annular passage 46 dependent upon the pressure relation between the spring 44 and that in the pipe 43 and the pressure on the clutch 16 is relieved to a value determined by the movement of the piston 36. The oil flow thus relieved is delivered to the pipe 54 and thence to the plates of the clutch 16.

To insure free action of the spring 44, a passage 58 connects the sump 24 with that portion of the chamber 35 which encloses this spring and, for the same purpose with respect to the spring 30 and diaphragm 40, a passage 59 connects the chamber 29 with the portion 60 of the chamber 35 between the piston 37 and diaphragm 40, and the chamber portion 60 connects through a passage 61 with the sump 24.

From the above, it will be apparent that the total flow from the oil pump 23 is used for cooling the plates of the clutch 16 and that the intensity of contact of these plates will infinitely vary with pressure variations in the pipe 22 from zero to maximum intensity and including infinitely variable conditionings of the clutch plates in relatively slipping relation. Speed of the centrifugal pump 19 and hence its pressure boosting action is therefore controlled by varying the capacity of the clutch 16.

We claim:

1. A booster pressure control for a liquid system supplied by an external pressure source comprising a booster pump interposed between the source and system, a constant speed power source, an hydraulically actuated, friction plate clutch engageable to provide a driving connection between the power source and booster pump, and an hydraulic system including an oil pump, first passage means connecting the oil pump to the clutch for applying engaging pressure thereto, a pressure regulating valve for determining the maximum clutch engaging pressure in the first passage means, second passage means connecting the pressure regulating valve outlet to the clutch plates for constantly supplying cooling oil thereto, and means responsive to pressure variations on the discharge side of the booster pump and operatively associated with the first passage means to bleed the pressure therein and reduce the clutch engaging pressure as the pressure in the liquid system approaches a determined value.

2. A booster pressure control as defined in claim 1 wherein the oil bled by the responsive means is directed to the second passage means.

3. A booster pressure control as defined in claim 1 wherein the responsive means is provided with piston means spring loaded at one end and abutting a diaphragm at the opposite end, the diaphragm being responsive to said pressure variations and the piston means being shiftable between limiting positions determining unrelieved and relieved pressure oil conditions in the first passage means.

4. A booster pressure control as defined in claim 3 wherein means is provided to conduct the relieved pressure oil to the second passage means.

5. A booster pressure control as defined in claim 1 wherein the first and second passage means are arranged in parallel flow relation and the responsive means is positioned in intersecting relation to the first passage means.

References Cited in the file of this patent

UNITED STATES PATENTS

| | | |
|---|---|---|
| 1,749,569 | De Florez | Mar. 4, 1930 |
| 2,009,001 | Peterson | July 23, 1935 |
| 2,276,794 | Ricci | Mar. 17, 1942 |
| 2,408,851 | Hillier et al. | Oct. 8, 1946 |
| 2,458,452 | Vanni | Jan. 4, 1949 |
| 2,599,680 | Weeks | June 10, 1952 |
| 2,909,258 | Lacroix | Oct. 20, 1959 |
| 3,007,414 | Long et al. | Nov. 7, 1961 |